US006910129B1

(12) United States Patent
Deng et al.

(10) Patent No.: US 6,910,129 B1
(45) Date of Patent: Jun. 21, 2005

(54) REMOTE AUTHENTICATION BASED ON EXCHANGING SIGNALS REPRESENTING BIOMETRICS INFORMATION

(75) Inventors: Robert Huijie Deng, Singapore (SG); Feng Bao, Singapore (SG); Yongdong Wu, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/518,416

(22) Filed: Mar. 3, 2000

(30) Foreign Application Priority Data

Dec. 24, 1999 (SG) ............................................. 9906598

(51) Int. Cl.[7] .............................. H04L 9/12; H04L 9/30
(52) U.S. Cl. ........................ 713/171; 380/30; 713/169; 713/178; 713/186
(58) Field of Search .................... 380/30; 713/168–171, 713/178, 186

(56) References Cited

U.S. PATENT DOCUMENTS

| | | | | |
|---|---|---|---|---|
| 4,710,613 A | * | 12/1987 | Shigenaga | 235/380 |
| 4,761,807 A | | 8/1988 | Matthews et al. | 379/89 |
| 4,998,279 A | | 3/1991 | Weiss | 380/23 |
| 5,412,738 A | | 5/1995 | Brunelli et al. | 382/115 |
| 5,440,635 A | * | 8/1995 | Bellovin et al. | 713/171 |
| 5,491,750 A | * | 2/1996 | Bellare et al. | 713/155 |
| 5,712,912 A | | 1/1998 | Tomko et al. | 380/23 |
| 5,720,034 A | * | 2/1998 | Case | 380/283 |
| 5,737,420 A | * | 4/1998 | Tomko et al. | 380/285 |
| 5,761,329 A | | 6/1998 | Chen et al. | 382/116 |
| 5,910,989 A | * | 6/1999 | Naccache | 713/173 |
| 6,571,344 B1 | * | 5/2003 | Sitnik | 713/502 |

FOREIGN PATENT DOCUMENTS

| | | |
|---|---|---|
| EP | 0752143 | 1/1997 |
| EP | 0924657 | 6/1999 |
| FR | 2734679 | 11/1996 |
| WO | 9857247 | 12/1998 |

OTHER PUBLICATIONS

Dwork et al., "Concurrent Zero–Knowledge," 1998.*
Needham, R. et al. "Using Encryption for Authentication and in Large Networks of Computers." Communications of the ACM, vol. 21 (1978) pp. 993–999.
Otway D. et al. "Efficient and Timely Mutual Authentication." Operating Systems Review, vol. 21, No. 1(1987) pp. 8–10.
Gong, L. et al. "Protecting Poorly Chosen Secrets from Guessing Attacks." IEEE Journal on Selected Areas in Communication, vol. 11 (1993) pp. 648–656.
Zimmerman, P.R. "PGPfone Owners Manual." Version 1.0 beta 5, Jan. 5, 1996, http://web.mit/edu/network/pgpfone/manual.
Diffie W. et al. "New Directions in Cyrptography." IEEE Transaction on Information Theory, vol. IT–22, No. 6 (1976) pp. 644–654.
English Abstract of FR 2734679 Dated Nov. 29, 1996.
Jedwab, J. et al. "Minimum Weight Modified Signed–Digit Representations and Fast Exponentiation." Electronics Letters (1989) vol. 25, No. 17 pp. 1171–1172.

* cited by examiner

Primary Examiner—Gregory Morse
Assistant Examiner—Matthew Heneghan
(74) Attorney, Agent, or Firm—Ladas & Parry LLP

(57) ABSTRACT

A method, an apparatus, and a computer program product for remote authentication are disclosed. The methods are based on exchanging of signals representing remote party's biometrics information (such as acoustic waveforms) and have application in secure telephony or video-conferencing communications over open networks. The apparatus includes a speech encoding/decoding module (632), a control module (636), an encryption/decryption module (640), a key generator (650), a Diffie Hellman key exchange system (660), a timer module (670) for measuring time between a challenged statement and a corresponding response statement, an input/output (I/O) module (680) for transmitting and receiving data via a communications channel 610.

50 Claims, 7 Drawing Sheets

REMOTE AUTHENTICATION BASED ON EXCHANGING SIGNALS REPRESENTING BIOMETRICS INFORMATION

FIELD OF THE INVENTION

The present invention relates to the field of secure communications and in particular to techniques of remote authentication of, and secret key establishment between, communicating parties to protect or secure communications over insecure channels.

BACKGROUND

Individuals or computer systems often need to have authenticated and confidential communications over an open channels, such as the Internet. While such secure communications may be achieved by physical means, it is more cost effective and flexible to use cryptographic means.

To have secure communications using cryptographic means, parties need to first execute a protocol to authenticate each other and at the same time establish a mutually agreed conventional up on secret key, which is then used to encrypt subsequent communications between the parties. Conventional authentication and key exchange protocols normally require that, the parties either share a secret (e.g., a password) or know each other's public keys.

A cryptographic system, or cryptosystem, uses an encryption key to convert plaintext into ciphertext (an unintelligible or undecipherable form of the original information) and a decryption key to recover the plaintext from ciphertext. If the encryption key and the decryption key are identical, the cryptosystem is referred to as symmetric key cryptosystem. If the encryption and decryption keys are different and it is computationally infeasible to determine the decryption key from the encryption key, the cryptosystem is referred to as an asymmetric key cryptosystem or public key cryptosystem. In a public key cryptosystem, anyone can encrypt a message using a public encryption key. However, only the holder of a corresponding private decryption key can decrypt the ciphertext and recover the message. In a public key cryptosystem, it is often important to securely bind a public key with the legitimate user's ID. Such a binding can be achieved using public key certificates, which are digitally signed and issued by a certification authority.

Roughly speaking, a one-way hash function h( ) has the properties that:

1) for any message m, the hash h(m) can be easily computed;
2) given h(m), finding m is computationally infeasible; and
3) finding two messages that have the same hash is computationally infeasible.

For more information on cryptosystems, digital signature schemes, public key certificates, and one-way hash functions, reference is made to A. Menezes, P. Oorschot, and S. Vanstone, *Handbook of Applied Cryptography*, CRC Press, pp. 425–488, pp. 559–561, and pp. 321–383 1996; and C. Kaufman, R. Perlman, and M. Speciner, *Network Security—Private Communication in A Public World*, PTR Prentice Hall, Englewood Cliffs, N.J., pp. 152–158, pp. 177–204 and pp. 101–129 1995.

The UNIX (a trademark of Bell Laboratories) operating system provides a classical example of a password based authentication system. In UNIX, each user is provided with a unique login user name and is allowed to choose a secret password. The UNIX system maintains a password file containing the user name and a hash of the user's password computed using a one-way hash function with the user's password as input. When a UNIX user desires to access the UNIX system, the user keys in his or her user name and password to a terminal. The terminal computes the hash of the password and sends the hash along with the user name to the UN system. Because only the user knows the password, if the hash and user name match those in the password file, the user is considered authenticated.

The UNIX password system is simple to implement, but has a number of problems. Firstly, it is vulnerable to a "replay" attack. That is an eavesdropper can intercept the user name and the hash of the password, and replay them to the UNIX system. Secondly, knowing the hash of a password, an eavesdropper can mount an off-line dictionary attack. The person can guess a password, compute its hash, and see if the two hash values match. The person can then systematically try passwords, one at a time, until a match is found. Since people tend to choose easy to remember or "weak passwords", such an attack can be very effective. Thirdly, the UNIX system only authenticates the user, and no secret key is established to encrypt subsequent interactions between the user and the system.

A number of authentication and key establishment protocols have been proposed to improve upon the UNIX password protocol. Examples include:

1) R. Needham and M. Schroeder, "Using encryption for authentication in large networks of computers", *Communications of the ACM*, Vol. 21, December 1978, pp. 993–999;
2) D. Otway and O. Rees, "Efficient and timely authentication", *Operating Systems Review*, Vol. 21, No. 1, January 1987, pp. 8–10;
3) L. Gong, M. Lomas, R. Needham, and J. Saltzer, "Protecting poorly chosen secrets from guessing attacks", *IEEE Journal on Selected Areas of Communications*, Vol. 11, No. 5, June 1993, pp. 648–656; and
4) U.S. Pat. No. 5,440,635 issued to S. Bellovin and M. Merritt on Aug. 8, 1995.

A number of the conventional authentication protocols require that the parties share secret information (such as a password) or possess each other's public keys in advance. There are many potential difficulties for a human user to share secrets with a large number of remote parties. Firstly, it requires a secure secret distribution mechanism to be in place. Secondly and more importantly, human users are not good at remembering secrets of good quality, since such secrets look like random data. Knowing each other's public key in authenticated manners is also problematic in a distributed and open environment.

Without good authentication and encryption, voice-over-IP (the Internet protocol) can be eavesdropped without much difficulty. Pretty Good Privacy Phone or PGPfone (both are trademarks of Pretty Good Privacy Inc.) implements an authentication protocol based on exchange of voice signals and Diffie-Hellman key exchange protocol, P. Zimmermann, *PGPfone Owner's Manual, Version 1.0 beta 5*, 5 Jan. 1996, http://web.mit.edu/network/pgpfone/manual.

Before proceeding with a discussion of the PGPfone authentication protocol, the Diffie-Hellman key exchange protocol, W. Diffie and M. Hellman, "New directions in cryptography", *IEEE Transactions on Information Theory*, Vol. IT-22, No. 6, pp. 644–654, November 1976 is reviewed. Diffie-Hellman key exchange allows two parties, without sharing keying material in advance, to agree to a secret key over an open channel, but without authentication. In Diffie-Hellman key exchange, two parties A and B agree on an appropriate prime p and a generator of $Z^*_p$, where $Z^*_p = \{x|0<x \leq p-1\}$. Party A generates a random number x, $1<x<p-1$, and then computes and sends to Bob $g^x$ modulo p. Party B generates a random number y, $1<y<p-1$, and then computes and sends to party A $g^y$ modulo p.

Party A computes a shared key $k=(g^y)^x$ modulo p, and party B computes $k=(g^x)^y$ modulo p. The Diffie-Hellman protocol can be carried out in any group in which the discrete logarithm problem is difficult to solve. This protocol, however, is vulnerable to "man-in-the-middle" attacks. If a party C comes in the middle between parties A and B, when party A wishes to have a Diffie-Hellman exchange with party B, party C intercepts all the messages from A and B and enters the Diffie-Hellman exchange with A and B, respectively. As a result, C agrees a secret key with A and another secret key with B so that C can decrypt all the messages from A using the key shared with A and re-encrypt the messages using the key shared with B.

The PGPfone authentication protocol assumes that the two parties are familiar with each other's voice. The two parties first establish a shared value (e.g., $g^{xy}$ mod p) by performing a Diffie-Hellman exchange. The parties next compute the hash of the shared value. Each party then reads the first few bytes (in hexadecimal format or in English words. PGPfone; maintains a list that maps the 256 values of a byte to 256 English words) of the hash to each other. If the bytes at the two ends match and if the voice sounds like that of the claimed party, the parties are considered authentic. However, if an attacker is able to collect sound samples of all the 256 words by, for example, eavesdropping on someone's phone calls, the attacker is able to impersonate the victim at will.

Thus, a need clearly exists for a method of remote authentication based on exchanging signals representing biometrics information and establishing a cryptographic key.

SUMMARY

In accordance with one aspect of the invention, a method of authenticating a remote party and establishing a cryptographic key for secure communications via an insecure communications channel. The method includes the steps of:

generating a first challenge signal of minimum duration T, where T is a fixed time interval;

generating a random number x, computing $g^x$ modulo p, where g and p are numbers, deriving a key $k_A$ from $g^x$ modulo p, encrypting the first challenge signal with $k_A$ and a symmetric key cryptosystem, and sending a first ciphertext to the remote party;

receiving a second ciphertext from the remote party, sending $g^x$ modulo p to the remote party, and starting a clock;

receiving a third ciphertext and $g^y$ modulo p from the remote party, stopping the clock, and computing an elapsed time interval of the clock;

deriving a key $k_B$ from $g^y$ modulo p, computing $g^{xy}$ modulo p, deriving a key $k_{AB}$ from $g^{xy}$ modulo p, decrypting the second ciphertext with $k_B$ to recover a second challenge signal from the remote party, decrypting the third ciphertext to recover a first response signal from the remote party;

verifying that the elapsed time of the clock is within a predetermined interval ($TL_A$, $TU_A$), where $TL_A$ and $TU_A$ are positive numbers;

verifying that the second challenge signal is produced by the remote party;

producing a second response signal of minimum duration T, encrypting the second response signal with $k_{AB}$ and sending a fourth ciphertext to the remote party;

verifying that the first response signal is a response produced by the remote party to the first challenge signal; and generating a key k from $g^{xy}$ modulo p for secure communications with the remote party.

Correspondingly, an apparatus and a computer program product based on the foregoing method are also disclosed.

In accordance with another aspect of the invention, there is disclosed a method of authenticating a remote party and establishing a cryptographic key for secure communications via an insecure communications channel. The-method includes the steps of:

receiving a first ciphertext from the remote party, generating a random number y, computing $g^y$ modulo p, where g and p are numbers;

producing a first challenge signal of a minimum duration T, where T is a fixed time interval;

deriving a key $k_B$ from $g^y$ modulo p, encrypting the first challenge signal with $k_B$ and a symmetric key cryptosystem, and sending a second ciphertext to the remote party;

receiving $g^x$ modulo p from the remote party, deriving a key $k_A$ from $g^x$ modulo p, decrypting the first ciphertext to recover a second challenge signal from the remote party;

verifying that the second challenge signal is produced by the remote party, producing a first response signal of the minimum duration T;

computing $g^{xy}$ modulo p, deriving a key $k_{AB}$ from $g^{xy}$ modulo p, encrypting the first response signal, sending a third ciphertext and $g^y$ modulo p to the remote party, and starting a clock;

receiving a fourth ciphertext, stopping the clock, computing the elapsed time of the clock, and decrypting the fourth ciphertext to recover a second response signal from the remote party;

verifying that the elapsed time of the clock is within a predetermined interval ($TL_B$, $TU_B$), where $TL_B$ and $TU_B$ are positive numbers;

verifying that the second response signal is a response produced by the remote party to the first challenge signal; and generating a key k from $g^{xy}$ modulo p for secure communications with the remote party.

Correspondingly, an apparatus and a computer program product based on the foregoing method are also disclosed.

In accordance with yet another aspect of the invention, there is disclosed a method of authenticating a remote party and establishing a cryptographic key for secure communications via an insecure communications channel. The method includes the steps of:

generating a first challenge signal of minimum duration T, where T is a fixed time interval;

generating a random number x, computing $g^x$ modulo p, where g and p are numbers, deriving a key $k_A$ from $g^x$ modulo p, encrypting the first challenge signal with $k_A$ and a symmetric key cryptosystem, and sending a first ciphertext to the remote party;

receiving a second ciphertext, sending $g^x$ modulo p to the remote party, and starting a clock;

receiving $g^y$ modulo p, computing a key $k_B$ from $g^y$ modulo p, decrypting the second ciphertext to recover a second challenge signal from the remote party;

verifying the second challenge statement to ensure that the second challenge statement is produced by the remote party, and producing a first response signal of minimum duration T;

computing $g^{xy}$ modulo p, deriving a key $k_{AB}$ from $g^{xy}$ modulo p, encrypting the first response signal and sending a third ciphertext to the remote party;

receiving a fourth ciphertext from the remote party, stopping the clock, decrypting the fourth ciphertext with $k_{AB}$ to recover a second response signal from the remote party;

verifying that the elapsed time of the clock is within a predetermined interval ($tl_A$, $tu_A$), where $tl_A$ and $tu_A$ are positive numbers;

verifying that the second response signal is a response produced by the remote party to the first challenge signal; and generating a key k from $g^{xy}$ modulo p for secure communications with the remote party.

Correspondingly, an apparatus and a computer program product based on the foregoing method are also disclosed.

In accordance with a further aspect of the invention, there is disclosed a method of authenticating a remote party and establishing a cryptographic key for secure communications via an insecure communications channel. The method includes the steps of:

receiving a first ciphertext from remote party, generating a random number y, and computing $g^y$ modulo p, where g and p are numbers;

producing a first challenge signal of minimum duration T, where T is a fixed time interval;

deriving a key $k_B$ from $g^y$ modulo p, encrypting the first challenge signal with $k_B$ and a symmetric key cryptosystem, and sending a second ciphertext;

receiving $g^x$ modulo p, computing a key $k_A$ from $g^x$ modulo p, decrypting the first ciphertext to recover a second challenge signal from remote party, sending $g^y$ to remote party and starting a clock;

verifying the second challenge statement to make sure that the second challenge statement is produced by the remote party, and then producing a first response signal of minimum duration T; computing $g^{xy}$ modulo p, deriving a key $k_{AB}$ from $g^{xy}$ modulo p, encrypting the first response signal and sending a third ciphertext to the remote party;

receiving a fourth ciphertext from the remote party, stopping the clock, decrypting the fourth ciphertext with $k_{AB}$ to recover a second response signal from the remote party;

verifying that the elapsed time of the clock is within an interval ($tl_B$, $tu_B$), where $tl_B$ and $tu_B$ are positive numbers;

verifying that the second response signal a response produced by the remote party to the first challenge signal; and generating a key k from $g^{xy}$ modulo p for secure communications with the remote party.

Correspondingly, an apparatus and a computer program product based on the foregoing method are also disclosed.

BRIEF DESCRIPTION OF THE DRAWINGS

A small number of embodiments of the invention are described hereinafter with reference to the drawings, in which.

DETAILED DESCRIPTION

A method, an apparatus, and a computer program product for remote authentication based on exchanging signals representing biometrics information and establishing a cryptographic key are described. In the following description, numerous details are set forth including communications channels for example. It will be apparent to one skilled in the art, however, that the present invention may be practised without these specific details. In other instances, well-known features are not described in detail so as not to obscure the present invention.

The detailed description is organised as follows:
1. Notation and Definitions
2. Block Diagram of Communications Device
3. First Embodiment
4. Second Embodiment
5. Security Considerations
6. Computer Implementation In the following description, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

1. Notation and Definitions

The following notation is used throughout:

A, B: Parties (Alice and Bob, respectively) that seek to have secure communications;

e(k, m): Encrypted message containing original message m and a key k using a symmetric key cryptosystem;

d(k, c): Decrypted message containing a ciphertext c and the key k using a symmetric key cryptosystem;

$C_X$: An acoustic wave or digital representation of a challenge statement spoken by a party X (either A or B); whether $C_X$ is an acoustic wave or a digital representation should be clear to those skilled in the art from the discussion context;

$R_Y$: An acoustic wave or digital representation of a response statement spoken by a party Y in reply to $C_X$; whether $R_Y$ is an acoustic wave or a digital representation should be clear to those skilled in the art from the discussion context;

$|C_x|$: the time duration of $C_x$;

$|R_y|$: the time duration of $R_y$; and

T: A required minimum time duration of any statement spoken by a party.

In the following description, "secure communications" means communications that are authenticated or confidential.

Figure 1:
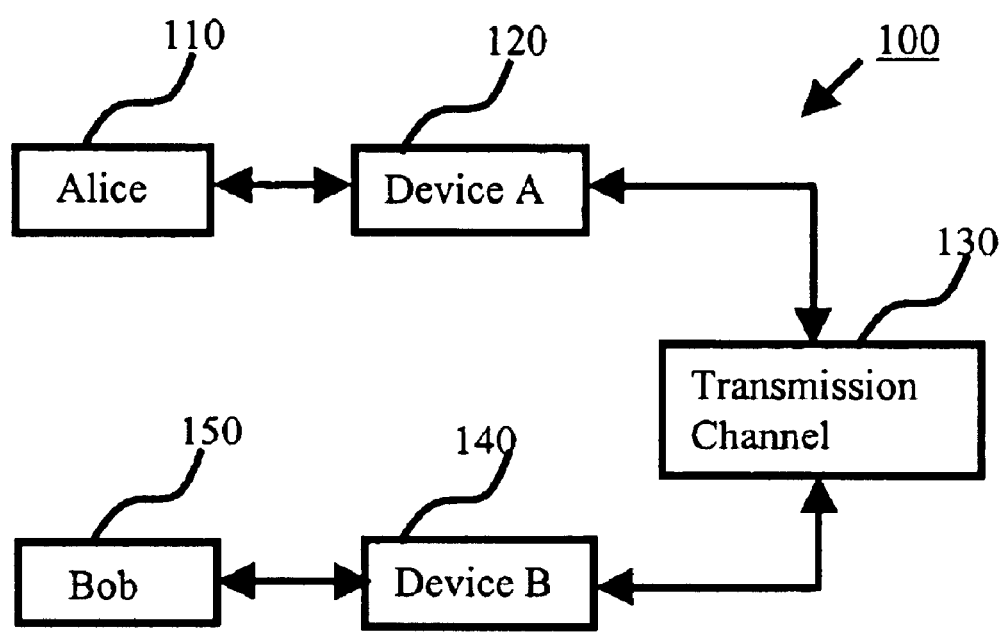
FIG. 1 is a block diagram illustrating a communication system model between two remote individuals over an open transmission channel.

FIG. 1 illustrates a general model 100 of communications between two remote individuals. In this model 100, Alice 110 and Bob 150 are two individuals, who are familiar with each other's biometrics characteristics (without loss of generality, voice signals are used hereinafter) and wish to have a secure communication. The transmission channel 130 represents the means, and more specifically the media, through which communication messages are exchanged between the communication devices 120, 140. The transmission channel 130 includes, but is not limited to, any communications means or media such as computer networks, public telephone switching networks, and radio links. Alice 110 and Bob 150 communicate with each other by interfacing through communication devices (A) 120 and (B) 140, respectively. Devices (A, B) 120, 140 have appropriate speech signal processing capabilities (such as speech encoding and decoding). The devices 120, 140 accept audio input, either directly or indirectly, from Alice 110 and Bob 140, respectively, and output the other party's received audio signal.

In the embodiments of the invention, devices (A, B) 120, 140 each exchange signals using a Diffie-Hellman key exchange system and a symmetric key cryptosystem. For the purposes of illustration only, both devices (A, B) 120, 140 are assumed to have access to a common set of Diffie-Hellman parameters, g and p, which maybe distributed either off-line or on-line.

The minimum duration of any statement spoken by a party 110, 150 is required to be T, where T is either pre-fixed or agreed upon by Alice 110 and Bob 150. For security reasons, T should be much longer than the channel round-trip delay and the processing delay of each device 120, 140. For example, T may be in the range of tens of seconds to several minutes, while channel round-trip delay and processing delays are normally less than one second. To keep notation compact, only residues modulo are used hereinafter: that is, $g^x$ modulo p, $g^y$ modulo p, and $g^{xy}$ modulo p are written simply as $g^x$, $g^y$, and $g^{xy}$, respectively. In addition, while not mentioned explicitly, devices (A and B) 110, 150 are assumed to perform audio encoding/decoding and audio compression/decompression operations, whenever necessary.

In the embodiments of the invention, the communicating parties are assumed to be familiar with each other's voice (biometrics characteristics in general) and able to recognise each other by listening to each other's speech. This is a reasonable requirement, since there are generally no confidential topics between two strangers without the involvement of a trusted third party. In the embodiments, party 110 (Alice) starts a session with party 150 (Bob) by speaking a challenge statement such as:

"This is Alice! The time is 21 minutes passed 9 AM. How was your mid-term examination, Bob?".

Upon hearing Alice's message, party 150 (Bob) is expected to speak a response statement like:

"Hi, Alice! Bob's here. My mid-term exam was not very good. But thank God, it is over!".

In the embodiments, Alice is assumed to be able to distinguish whether the stated response is in Bob's voice and whether the stated response corresponds to her challenge statement in the first place. Furthermore, it is assumed that it is difficult for an attacker to mimic a target party's voice to produce a meaningful response statement in real-time.

2. Block Diagram of Communications Device

Figure 6:
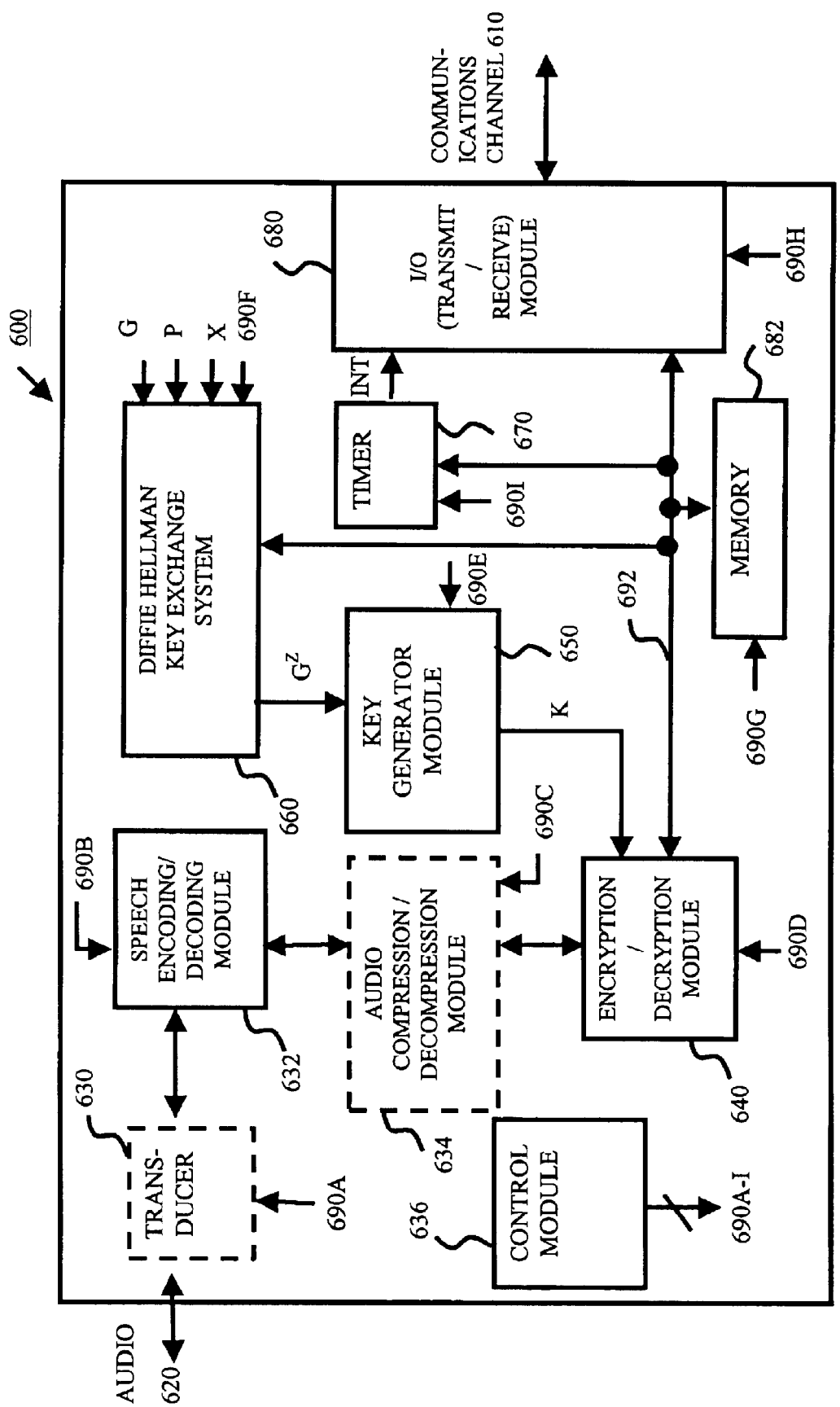
FIG. 6 is a block diagram illustrating a communication device in accordance with the first embodiment of the invention.

FIG. 6 is a block diagram of a communication device 600 in accordance with the embodiments of the invention. The communications device 600 includes a speech encoding/decoding module 632, a control module 636, an encryption/decryption module 640, a key generator 650, a Diffie Hellman key exchange system 660, a timer module 670, an input/output (I/O) module 680 for transmitting and receiving data via the communications channel 610, and a memory 682. Optionally, the device 600 also includes a transducer module 630 and an audio compression/decompression module 634.

The control module 636 controls the components of the device 600 via signals 690A–690I. The transducer module 630 converts audio 620 into audio signals and vice versa. Operation of the transducer module 630 can be controlled by the control module 636 via a control signal(s) 690A. In turn, the transducer 630 is coupled bidirectionally with the speech encoding/decoding module 632. This module 632 speech encodes and decodes data and is controlled by the control module 636 via the signal(s) 690B. Optionally, the speech encoding/decoding module 632 is coupled bidirectionally to an audio compression/decompression module 634. Otherwise, the module 632 can be directly coupled to an encryption/decryption module 640. The control module 636 is coupled to the audio compression/decompression module 634 via the control signal 690C.

The encryption/decryption module 640 is optionally coupled to the audio compression/decompression module 634 and is coupled to the control module 636 via a control signal(s) 690D. The encryption/decryption module 640 is also coupled to memory 682, Diffie Hellman key exchange system 660, timer module 670, and the I/O module 680 by bus 692. The key generator 650 is coupled between the Diffie Hellman key exchange system 660 and the encryption/decryption module 640. The key generator 650 produces a key k from a code $G^Z$ and is coupled to the control module 636 via a control signal(s) 690E. The memory 682 is coupled to the control module 636 via a control signal(s) 690G.

The Diffie Hellman key exchange system 660 has as inputs code G, prime number P, random value X, and a control signal(s) 690F from control module 636. The timer module 670 has an interrupt (INT) output to the I/O module 680 that allows the timer module 670 to interrupt transmission/reception of data via the I/O module 680. The timer module 670 is coupled to the control module 636 via a control signal 690I. The I/O module 680 is coupled to the control module 636 by control signal(s) 690H. Operation of the communication device 600 is described hereinafter with reference to the first and second embodiments.

The embodiments of the invention advantageously employ mechanisms that enable users to authenticate each other and have secure communications over open or insecure channels by using a different technique. More particularly, users are not required to share or remember any secret key or password, or possess each other's public keys in advance. Authentication and key establishment are achieved by exchanging signals representing a remote party's biometrics information. In this connection, the embodiments of the invention utilize a cryptographic one-way hash function. The embodiments concentrate on authenticating remote human users based on the interaction of signals representing a remote party's biometrics information (such as acoustics waves). Parties are assumed to be able to identify each other based on the exchanged biometrics signals. There is no need for the parties to share any secret key, or know each other's public key in advance. The embodiments of the invention can be advantageously employed in applications such as Internet telephoning or voice-over-IP (Internet Protocol).

3. First Embodiment

Figure 2:
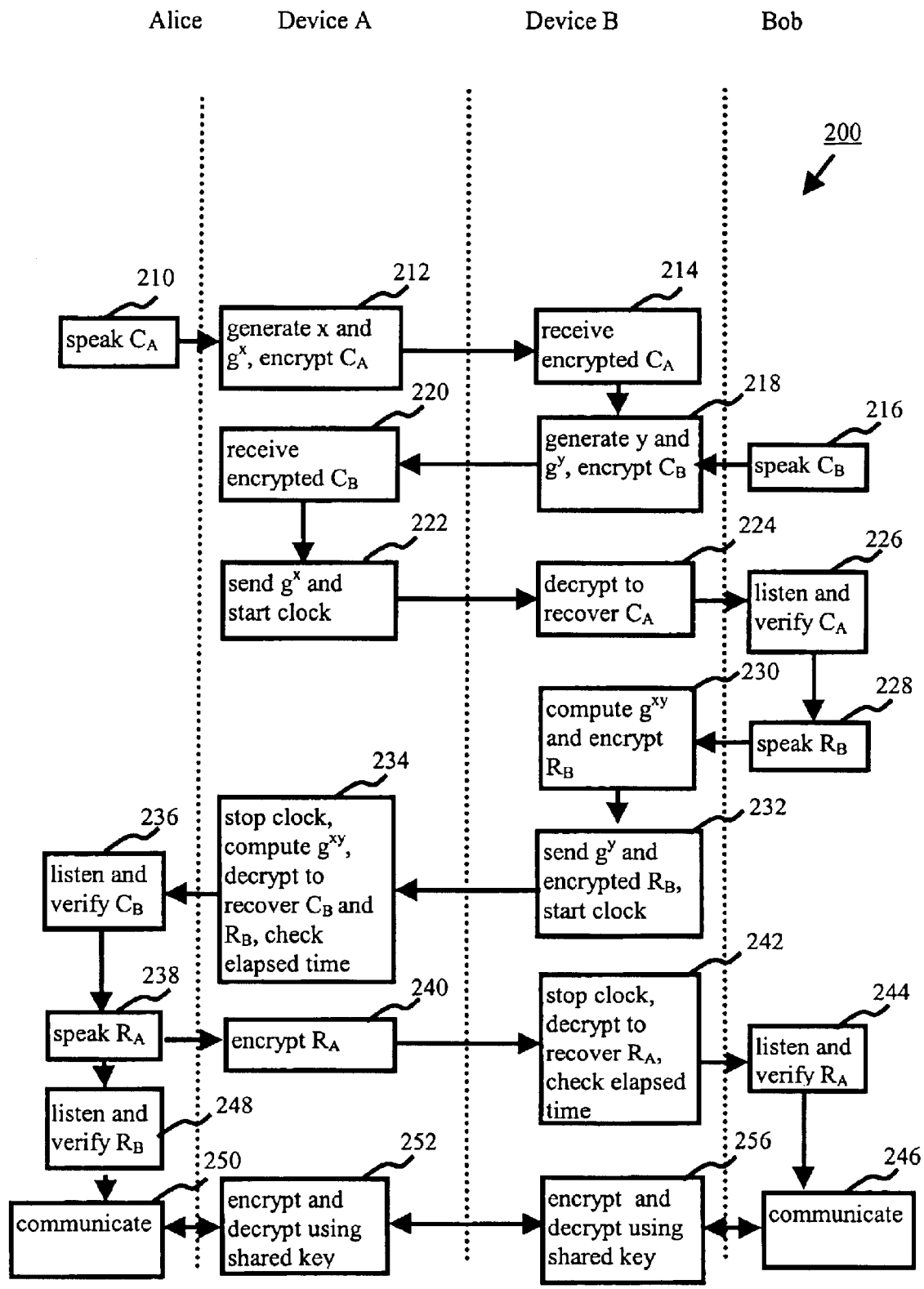
FIG. 2 is a flowchart depicting the operation of a first embodiment of the invention.

FIG. 2 is a flowchart illustrating the method of secure communications 200 according to the first embodiment of the invention. The flowchart is organised in columns in the following order: Alice 110, device (A) 120, device (B) 140, and Bob 150. In step 210, Alice 110 speaks a challenge statement $C_A$, which is input to Device A (shown as device 600 in FIG. 6). Preferably, the challenge statement $C_A$ contains some "freshness" elements, such as the date and time, and news headlines of the day. In step 212, Device A generates a random number x and computes $g^x$. Device A then preferably computes a key $k_A$ from code $g^x$ using the key generator. Next, Device A encrypts the challenge statement $C_A$ with key $k_A$ using the key generator and sends the ciphertext, referred to as Message A1:

$$e(k_A, C_A)$$

preferably together with Alice's identity to Device B over the transmission channel 610.

In step 214, Device B receives the Message A1 and prompts Bob to speak a challenge statement $C_B$ in step 216. In step 218, Device B generates a random number y, computes $g^y$ and preferably a key $k_B$ from the code $g^y$ for a symmetric key cryptosystem. Device B then encrypts $C_B$ and transmits the ciphertext, referred to as Message A2:

$$e(k_B, C_B),$$

preferably together with Bob's identity to Device A.

In step 220, Device A receives the Message A2. In step 222, Device A sends to Device B the code, referred to as Message A3:

$$g^x,$$

and starts a clock or timer to measure the time interval for a response. In step 224, after receiving code $g^x$, Device B computes the key $k_A$ from the code $g^x$ and decrypts the ciphertext received in Message A1 to recover the challenge statement $C_A$. Device B then plays back the challenge statement $C_A$ to Bob. In step 226, Bob listens to the challenge statement $C_A$ and verifies that the voice belongs to Alice. If the verification fails, Bob terminates the session. Otherwise, in step 228, Bob speaks a response statement $R_B$ in reply to the challenge statement $C_A$ (e.g., by iterating $C_A$ in his own voice).

In step 230, Device B computes the code $(g^x)^y = g^{xy}$ and a key $k_{AB}$ from $g^{xy}$ in well-known fashion for the symmetric key cryptosystem, and encrypts $R_B$ with $k_{AB}$ and the symmetric key cryptosystem to obtain $e(k_{AB}, R_B)$. In step 232, Device B sends, as Message A4, the following:

$$g^y, e(k_{AB}, R_B),$$

to Device A and then starts its clock.

In step 234, upon receipt of Message A4, Device A first stops its clock started in step 222. Time $t_A$ is the elapsed time of the clock. Device A then computes the code $(g^y)^x = g^{yx}$, the key $k_{AB}$ from code $g^{yx}$, and the key $k_B$ from the code $g^y$. Device A then decrypts $e(k_B, C_B)$ with the key $k_B$ and $e(k_{AB}, R_B)$ with key $k_{AB}$ to recover the challenge statement $C_B$ and the response $R_B$, respectively. $|C_A|$ is the duration of the challenge statement $C_A$, and $|R_B|$ is the duration of the response $R_B$. It will be readily apparent to those skilled in the art how to obtain the duration of an audio signal. Let $TL_A = |C_A| + |R_B|$. Further, in step 230, Device A checks the elapsed time $t_A$ to see if:

$$t_A \in (TL_A, TU_A), \quad (1)$$

where $TU_A$ can be taken advantageously as $T + TL_A$ if the channel round trip delay and processing delay in Devices A and B 120, 140 are negligible compared with T. Such delays can be easily incorporated into Equation (1) by those skilled in the art. If $t_A \in (TL_A, TU_A)$ is not true, Device A terminates the session. Otherwise, in step 236, Alice listens and verifies the challenge statement $C_B$.

If Alice recognises that the challenge statement $C_B$ is not Bob's voice, Alice terminates the session. Otherwise, in step 238, Alice speaks a response statement $R_A$ (e.g., by iterating $C_B$ in her own voice) in reply to the challenge statement $C_B$. In step 240, Device A encrypts the response statement $R_A$ with the key $k_{AB}$ and sends to Device B the ciphertext, as Message A5:

$$e(k_{AB}, R_A).$$

In step 248, following step 238, Alice listens and verifies the response statement $R_B$. If the response statement $R_B$ is not either a response to the challenge statement $C_A$ or in Bob's voice, Alice stops the session. If Alice is sure that the response statement $R_B$ is a reply to the challenge statement $C_A$ in Bob's voice, she begins communicating in step 250.

Next, from step 240 in step 242, upon receipt of Message A5, Device B stops its clock or timer. The time $t_B$ is the elapsed time of the clock. Also, Device B decrypts $e(k_{AB}, R_A)$ with the key $k_{AB}$ to obtain the response statement $R_A$. Let $|C_B|$ denotes the playback duration of $C_B$ and $|R_A|$ the playback duration of $R_A$. Let $TL_B = |C_B| + |R_A|$. In step 242, Device B checks the elapsed time to see if:

$$t_B \in (TL_B, TU_B), \quad (2)$$

where $TU_B$ can be taken advantageously as $T + TL_B$ if the channel round trip delay and processing delay at Devices A and B are negligible in comparison with T. If Equation (2) is not satisfied, Device B terminates the session. Otherwise, Device B plays back the response statement $R_A$ to Bob. In step 244, Bob listens and verifies the response statement $R_A$. If Bob recognises that $R_A$ is a reply to the challenge statement $C_B$ in Alice's voice, Bob can be confident that he is communicating with Alice and he can proceed to step 246. Otherwise, Bob stops the session.

In steps 250 and 246, respectively, Bob and Alice preferably communicate with each other. In step 252, Device A encrypts messages from Alice and decrypts messages from Bob with a key derived from $g^{xy}$, preferably using another symmetric key cryptosystem. Similarly, in step 256, Device B likewise encrypts messages from Bob and decrypts message from Alice with a key derived from $g^{xy}$ in the same way as Device A and with the same symmetric key cryptosystem as used by Device A.

4. Second Embodiment

Figure 3:
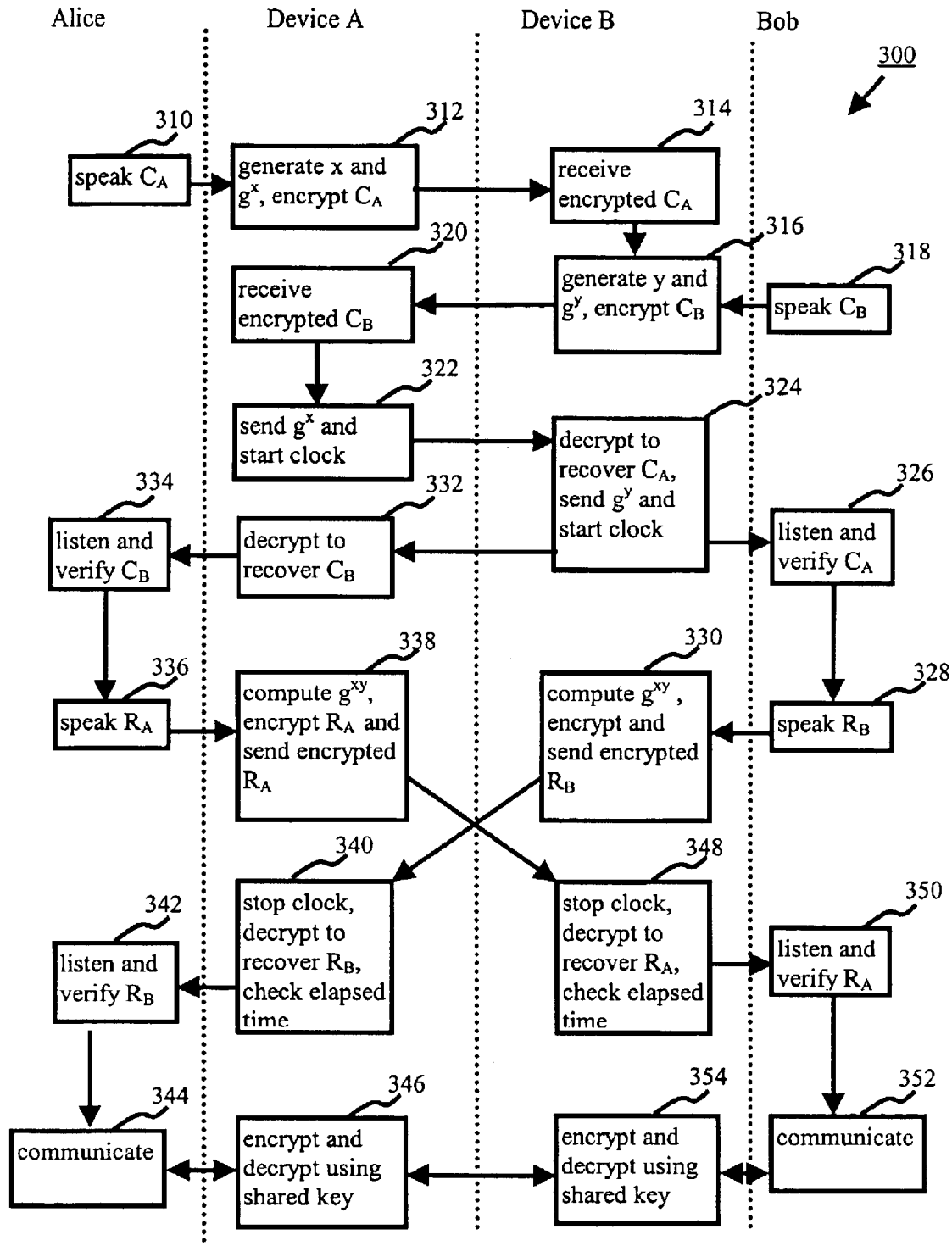
FIG. 3 is a flowchart showing the operation of a second embodiment of the invention.

FIG. 3 is a flowchart illustrating a method of secure communications 300 according to the second embodiment of the invention. In step 310, Alice starts the session by speaking a challenge statement $C_A$. In step 312, Device A generates a random value x, computes a code $g^x$ and a key $k_A$ from $g^x$ for a symmetric key cryptosystem, encrypts the challenge statement $C_A$ with $k_A$ and sends to B the ciphertext, as Message B1:

$$e(k_A, C_A).$$

In step 314, Device B receives Message B1. Next, in step 316, Device B prompts Bob to speak a challenge statement $C_B$ in step 318. In step 316, Device B then generates a random number y, computes code $g^y$ and a key $k_B$ from $g^y$ for a symmetric key cryptosystem, encrypts $C_B$ with $k_B$ and sends to Alice the ciphertext, as message B2:

$$e(k_B, C_B).$$

In step 320, Device A receives Message B2. Next, in step 322, Device A sends to Bob, as Message B3:

$$g^x,$$

and starts a clock.

In step 324, upon receipt of the Message B3, Device B computes a key $k_A$ from code $g^x$, decrypts $e(k_A, C_A)$ to recover $C_A$, sends to Alice as Message B4:

$$g^y,$$

and starts a clock. Device B then outputs the challenge statement $C_A$ to Bob. In step 326, Bob listens and verifies whether the challenge statement $C_A$ is in Alice's voice. Bob terminates the process if he has doubts on the originality of the challenge statement $C_A$. When the challenge statement $C_A$ is verified successfully by Bob, in step 328, Bob speaks a response statement $R_B$ in reply to the challenge statement $C_A$. In step 330, Device B computes code $g^{xy}$ and a key $k_{AB}$ from $g^{xy}$, encrypts $R_B$ and sends to Alice the ciphertext, as Message B5:

$$e(k_{AB}, R_B).$$

On the other hand, Message B4 is received by Device A in step 332. Device A computes $k_B$ from $g^y$, decrypts $e(k_B, C_B)$ to recover $C_B$. Alice listens and verifies $C_B$ in step 334. Alice stops the process if she believes that $C_B$ is not in Bob's voice; otherwise, she speaks a response statement $R_A$ in reply to $C_B$ in step 336. In step 338, Device A computes $g^{yx}$ and $k_{AB}$ from $g^{yx}$, encrypts $R_A$ and sends to Bob the ciphertext, as Message B6:

$$e(k_{AB}, R_A).$$

In step 340, Device A receives Message B5. Device A also stops the clock, decrypts $e(k_{AB}, R_B)$ to recover the response statement $R_B$ and checks to see if the elapsed time of the clock $T_A$ satisfies the following:

$$T_A \in (tl_A, tu_A), \quad (3)$$

where preferably $tl_A = |C_A| + |R_B|$ and $tu_A = tl_A + T$. Device A terminates the session if Equation (3) is not satisfied. Otherwise, Device A outputs the response statement $R_B$ to Alice. In step 342, Alice listens and verifies the response statement $R_B$. Alice stops the session if she is not convinced that the response statement $R_B$ is Bob's response to the challenge statement $C_A$. Otherwise, in step 344, Alice starts communications with Bob.

In step 348, upon receipt of the Message B6, Device B stops its clock, decrypts $e(k_{AB}, R_A)$ to recover $R_A$. Device B, then checks to see if the elapsed time of its clock satisfies the following:

$$T_B \in (tl_B, tu_B) \quad (4)$$

where preferably $tl_B = |C_B| + |R_A|$ and $tu_B = tl_B + T$. Device B terminates the session if Equation (4) is not satisfied. Otherwise, Device B outputs the response statement $R_A$ to Bob. In step 350, Bob listens and verifies $R_A$. Bob stops the session if he is not convinced that the response statement $R_A$ is Alice's response to $C_B$. Otherwise, in step 352, he starts communications with Alice.

With successful authentication of both Alice and Bob, Devices A and B, derive a key from $g^{xy}$ and use the key to encrypt and decrypt messages between Alice and Bob in steps 346 and 354, respectively, using communications obtained in steps 344 and 352.

5. Security Considerations

Symmetric key cryptosystems are used in the embodiments to encrypt challenge signals and response signals. It is important that all encryptions resist data modification (such as cut and paste) attacks.

The symmetric key cryptosystem used to encrypt challenge and response signals can be replaced by a cryptographic commitment function. Such a commitment function has the following properties:

1) no one can modify the contents of the commitment without being detected; and
2) no one can get any information about its contents unless the committing party discloses the information.

One way to form a commitment function is using a cryptographic one-way hash function h( ). To commit to an item I, the committing party computes the commitment h(k||I), where k is a secret key and k||I is the concatenation of k and I. To verify the commitment, the verifying party must have k and I, compute h (k||I) and compare h (k||I) with the commitment.

Checking the lengths of the elapsed time intervals of the clocks in both illustrative embodiments is very important in detecting any man-in-the-middle attacks. This is illustrated using the two attacking scenarios respectively, in relation to the first embodiment of FIG. 2. A similar analysis can be done for the second embodiment. In the following descriptions, the term "Alice" is used to refer to both the user Alice and Device A. Similarly, the term "Bob" is used to denote both the user Bob and Device B.

Figure 4:
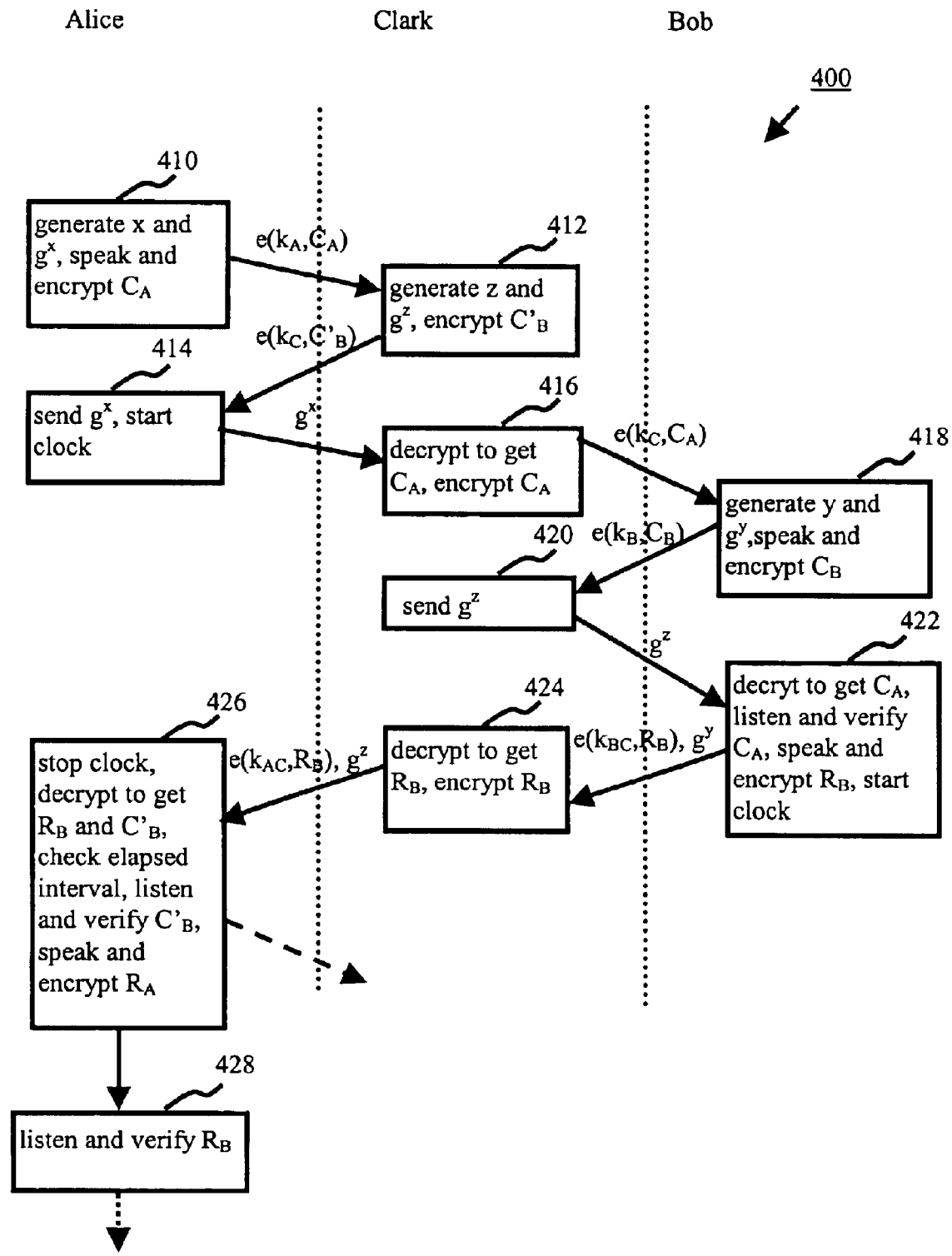
FIG. 4 is a flowchart depicting the first scenario of a man-in-the-middle attack in the first embodiment of FIG. 2.

FIG. 4 depicts a scenario 400 where Alice attempts to set up a communications session with Bob and where Clark performs a man-in-the-middle attempt to impersonate Bob to Alice. The flow diagram is accordingly organised into three columns: Alice, Clark and Bob. In Step 410, Alice starts a session by generating a random number x, computing $g^x$, speaking a challenge statement $C_A$, computing $k_A$ from $g^x$, encrypting $C_A$ with $k_A$, and sending the ciphertext $e(k_A, C_A)$ to Bob.

In step 412, the ciphertext is intercepted by Clark. Clark generates a number z, computes $g^z$ and a key $k_C$ from $g^z$, encrypts an old challenge statement $C'_B$ from Bob, and sends the ciphertext $e(k_C, C'_B)$ to Alice. In step 414, Alice receives the ciphertext, replies with $g^x$ and starts a clock. The code $g^x$ is again intercepted by Clark at step 416. In step 416, Clark derives the key $k_A$ from $g^x$ and decrypts $e(k_A, C_A)$ to recover $C_A$. Clark cannot mimic Bob's voice to produce a meaningful response statement $R_B$, so Clark impersonates Alice and starts a new session with Bob by sending Bob $e(k_C, C_A)$.

In step 418, upon receipt of $e(k_C, C_A)$, Bob generates a random value y, and computes code $g^y$ and a key $k_B$. Bob then speaks a challenge statement $C_B$, encrypts the challenge statement using key $k_B$, and sends the ciphertext $e(k_B, C_B)$ to Alice. Clark intercepts the ciphertext in step 420. To continue impersonating Alice, Clark sends $g^z$ to Bob. In step 422, Bob computes key $k_C$ from $g^z$, decrypts $e(k_C, C_A)$, and listens $C_A$, which was indeed spoken by Alice. Bob speaks a response statement $R_B$, computes a key $k_{BC}$ from $g^{zy}$, encrypts $R_B$ with $k_{BC}$, and transmits $g^y$ and the ciphertext $e(k_{BC}, R_B)$. In step 424, Clark again intercepts the ciphertext, computes the key $k_{BC}$ from $g^{yz}$, and decrypts $e(k_{BC}, R_B)$. Now Clark gets $R_B$. Clark then computes $k_{AC}$ from $g^{xz}$, encrypts $R_B$ with $k_{AC}$, and sends the ciphertext $e(k_{AC}, R_B)$ to Alice.

In step 426, Alice stops the clock, decrypts $e(k_C, C'_B)$ and $e(k_{AC}, R_B)$ to recover $C'_B$ and $R_B$, respectively. Alice also listens and verifies that $C'_B$ is in Bob's voice. Alice then speaks and encrypts a response statement $R_A$, and sends the ciphertext $e(k_{AC}, R_A)$.

Next, in step 428, Alice listens and verifies the response statement $R_B$. Since $R_B$ is indeed a response to $C_A$ from Bob, Alice is fooled into believing Clark is Bob. However, the embodiments of the invention prevent this from happening by checking the clock's elapsed time $t_A$ against the interval $(TL_A, TU_A)$ per Equation (1), where $TL_A = |C_A| + |R_B|$, and $TU_A = TL_A + T$.

To appreciate the rationale behind Equation (1), without the man-in-the-middle attack by Clark, $t_A = |C_A| + |R_B| + \Delta_{A1}$, where $\Delta_{A1}$ is the delay due to processing, transmission, and a pause interval introduced by Bob after listening to the challenge statement $C_A$, but before speaking the response statement $R_B$. However, with the man-in-the-middle attack shown in FIG. 4, $t_A = |C_A| + |R_B| + |C_B| + \Delta_{A2}$, where $\Delta_{A2}$ is a delay similar to $\Delta_{A1}$. Since it is required that $T >> \Delta_{A1}$ and $\Delta_{A2}$ and that $|C_B| \leq T$. It can be readily appreciated that $t_A = |C_A| + |R_B| + |C_B| + \Delta_{A2} > TL_A + T = TU_A$ with the attack and that $t_A = |C_A| + |R_B| + \Delta_{A1} \approx TL_A < TU_A$ without the attack. Therefore, by checking $t_A$ against Equation (1), the man-in-the-middle attacked can be detected.

Figure 5:
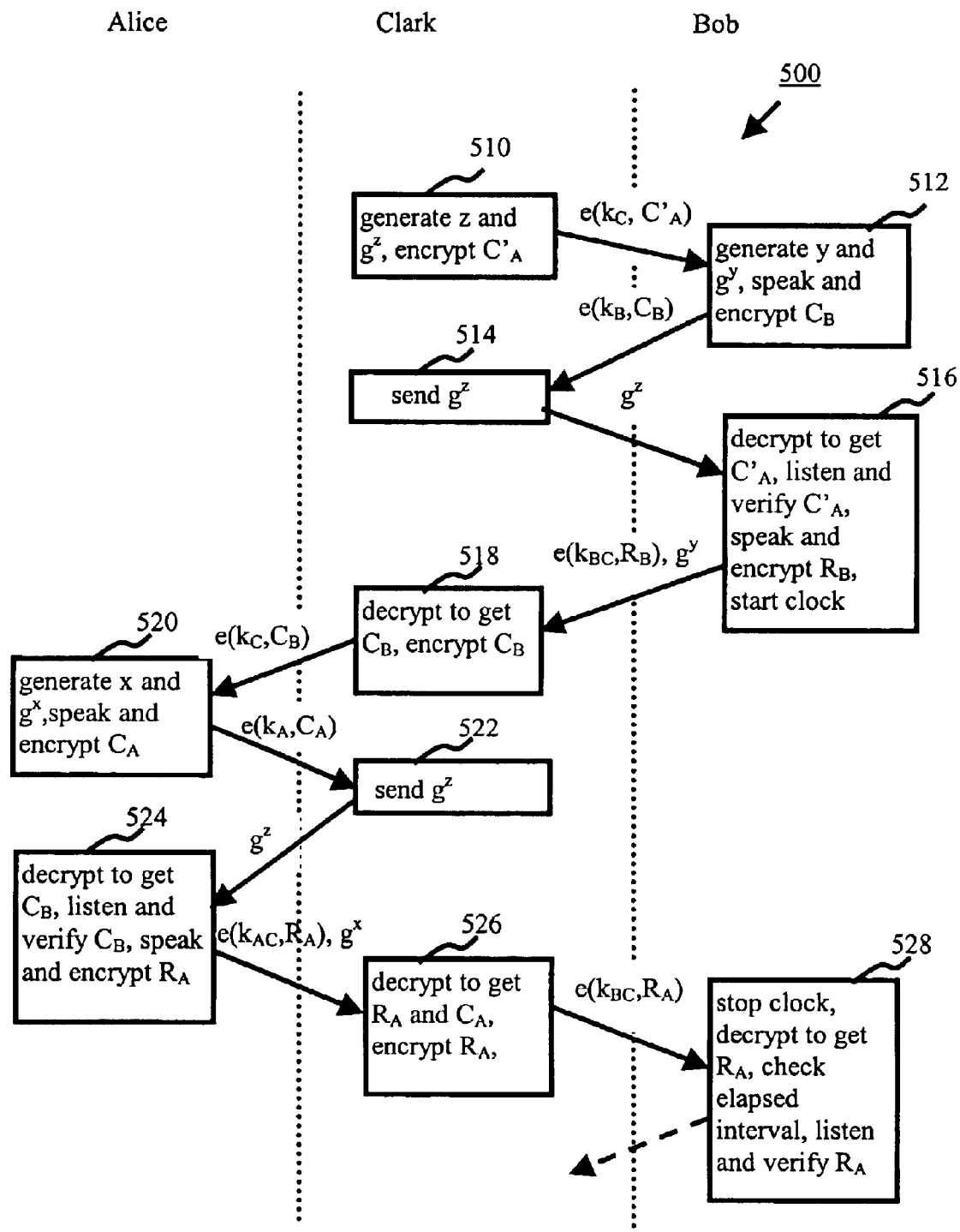
FIG. 5 is a flowchart showing the second scenario of a man-in-the-middle attack in the first embodiment of the invention of FIG. 2.

FIG. 5 shows a second scenario 500 of a man-in-the-middle attack, where Clark impersonates Alice to Bob. Again the flow diagram is organised in columns: Alice, Clark, and Bob. In step 510, Clark generates z, computes $g^z$ and a key $k_C$ from $g^z$, and encrypts $C'_A$—an old statement from Alice. Clark starts the impersonation by sending the ciphertext $e(k_C, C'_A)$ to Bob.

In step 512, upon receipt of the message from Clark, Bob generates y, $g^y$, and a key $k_B$ from $g^y$. Bob then speaks a challenge statement $C_B$, encrypts the challenge statement with $k_B$, and transmits the ciphertext $e(k_B, C_B)$ to Alice. In step 514, the ciphertext is intercepted by Clark and Clark sends $g^z$ to Bob. In step 516, Bob derives the key $k_C$ from $g^z$, and decrypts $e(k_C, C'_A)$ with $k_C$ to recover $C'_A$. Bob listens to the challenge statement $C'_A$ and believes that $C'_A$ was indeed spoken by Alice. Bob then speaks a response statement $R_B$, derives a key $k_{BC}$ from $g^{zy}$, encrypts $R_B$, transmits the ciphertext $e(k_{BC}, R_B)$ and $g^y$ and starts a clock.

Next, in step 518, upon interception of the ciphertext $e(k_{BC}, R_B)$ and $g^y$, Clark derives $k_B$ from $g^y$ and $k_{BC}$ from $g^{zy}$, and decrypts $e(k_B, C_B)$ to recover $C_B$. Since Clark is not able to reply to the challenge statement $C_B$ in Alice's voice, Clark encrypts the challenge $C_B$ with $k_C$ and starts a session with Alice by sending $e(k_C, C_B)$ to Alice. In step 520, upon receipt of $e(k_C, C_B)$, Alice generates x, $g^x$, and a key $k_A$ from $g^x$. Alice then speaks a challenge statement $C_A$, encrypts the challenge statement with $k_A$, and sends the ciphertext $e(k_A, C_A)$. In step 522, Clark intercepts the ciphertext and sends $g^z$ to Alice. In step 524, Alice derives a key $k_{AC}$ from $g^{zx}$, and decrypts $e(k_C, C_B)$ to recover $C_B$. Alice then listens to the challenge statement $C_B$ and believes that she hears Bob's voice. Alice then speaks a response statement $R_A$, encrypts the response statement with $k_{AC}$ and sends $g^x$ and the ciphertext $e(k_{AC}, R_A)$. In step 526, Clark intercepts the message from Alice and decrypts the ciphertext to obtain the response $R_A$. Clark then encrypts the response statement with $k_{BC}$ and sends the ciphertext $e(k_{BC}, R_A)$ to Bob.

In step 528, Bob receives $e(k_{BC}, R_A)$, stops the clock, and decrypts the ciphertext to recover $R_A$. Without checking the elapsed time of the clock, $t_B$, Bob can be misled into believing that Bob is communication with Alice since $R_A$ is Alice's reply to the challenge statement $C_B$. This attack can be foiled easily by checking $t_B$ against the interval $(TL_B, TU_B)$ (see Equation 2), where $TL_B = |C_B| + |R_A|$ and $TU_B = TL_B + T$. Without the man-in-the-middle attack by Clark, $t_B = |C_B| + |R_A| + \Delta_{B1}$, where $\Delta_{B1}$ is the delay due to processing, transmission, and a pause interval introduced by Alice after listening to $C_B$ but before speaking the response statement $R_A$. With the man-in-the-middle attack of FIG. 5, $t_B = |C_B| + |R_A| + |C_A| + \Delta_{B2}$, where $\Delta_{B2}$ is a delay similar to $\Delta_{B1}$. It is required that $T >> \Delta_{B1}$ and $\Delta_{B2}$ and that $|C_A| \leq T$. Then it can be seen that $t_B = |C_B| + |R_A| + |C_A| + \Delta_{B2} < TL_B + T = TU_B$ with the attack and $t_B = |C_B| + |R_A| + \Delta_{B1} \approx TL_B < TU_B$ without the attack. Therefore, by checking $t_B$ against Equation (2), the man-in-the-middle attack can be detected.

6. Computer Implementation

Figure 7:
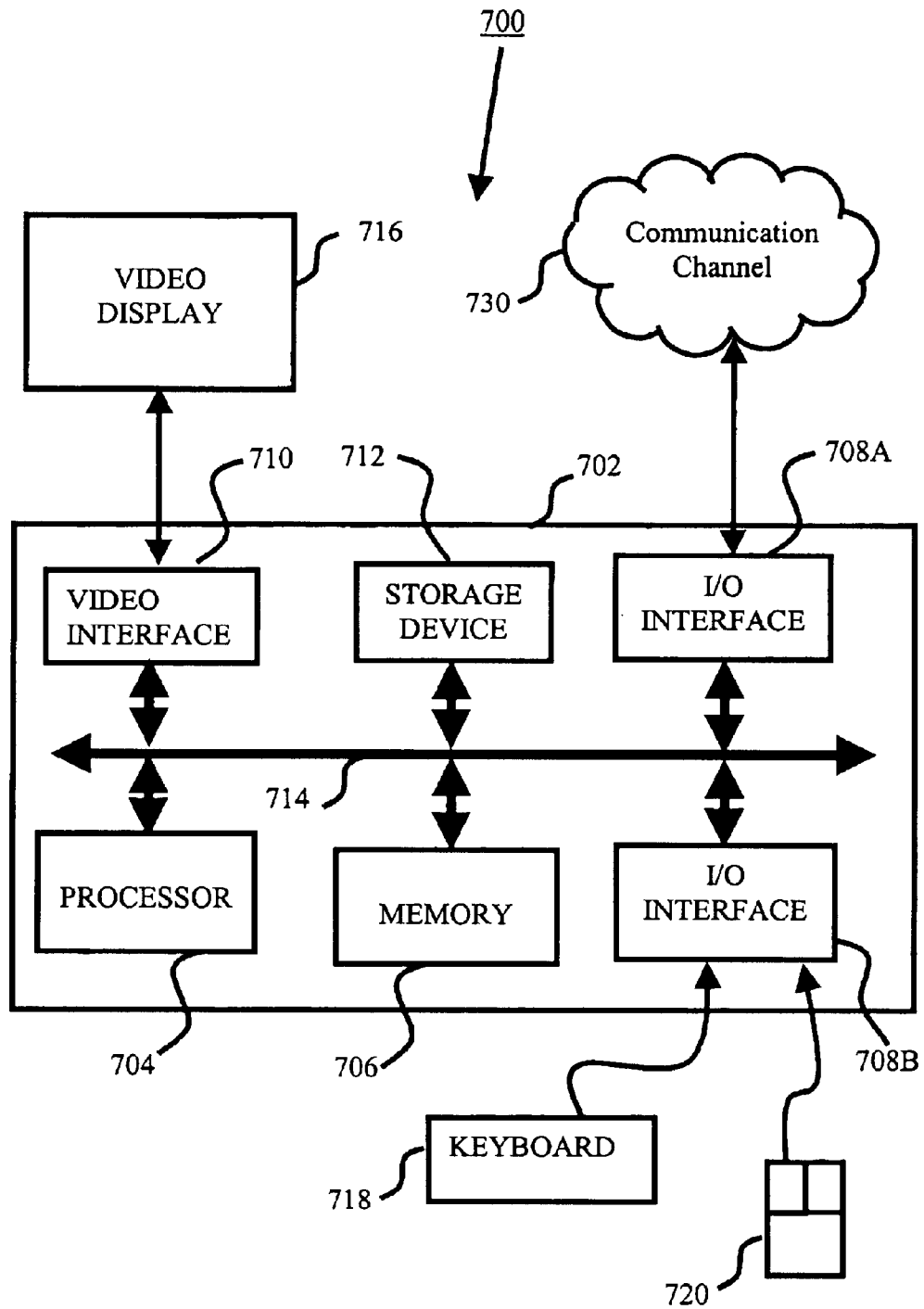
FIG. 7 is a block diagram of a general-purpose computer with which the embodiments of the invention can be practised.

The embodiments of the invention are preferably implemented using a computer(s), such as the general-purpose computer shown in FIG. 7. In particular, the processes of FIGS. 2 and 3 can be implemented as software, or a computer program, executing on the computer, where each communication device 120, 140, 600 of FIGS. 1 and 6 can be implemented using a general purpose computer. The method or process steps for remote authentication based on exchanging signals representing biometrics information are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for remote authentication based on exchanging signals representing biometrics information in accordance with the embodiments of the invention.

The computer system 700 consists of the computer 702, a video display 716, and input devices 718, 720. In addition, the computer system 700 can have, any of a number of other output devices including line printers, laser printers, plotters, and other reproduction devices connected to the computer 702. The computer system 700 can be connected to one or more other computers via a communication interface 708*b* using an appropriate communication channel 730 such as a modem communications path, a computer network, or the like. The computer network may include a local area network (LAN), a wide area network (WAN), an Intranet, and/or the Internet.

The computer 702 itself consists of a central processing unit(s) (simply referred to as a processor hereinafter) 704, a memory 706 which may include random access memory (RAM) and read-only memory (ROM), input/output (IO) interfaces 708A, & 708B a video interface 710, and one or more storage devices generally represented by a block 712 in FIG. 8. The storage device(s) 712 can consist of one or more of the following: a floppy disc, a hard disc drive, a magneto-optical disc drive, CD-ROM, magnetic tape or any other of a number of non-volatile storage devices well known to those skilled in the art. Each of the components 704 to 712 is typically connected to one or more of the other devices via a bus 714 that in turn can consist of data, address, and control buses.

The video interface 710 is connected to the video display 716 and provides video signals from the computer 702 for display on the video display 716. User input to operate the computer 702 can be provided by one or more input devices 708B. For example, an operator can use the keyboard 718 and/or a pointing device such as the mouse 720 to provide input to the computer 702.

The system 700 is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing are merely exemplary of the types of computers with which the embodiments of the invention may be practiced. Typically, the processes of the embodiments, described hereinafter, are resident as software or a program recorded on a hard disk drive (generally depicted as block 712 in FIG. 7) as the computer readable medium, and read and controlled using the processor 704. Intermediate storage of the program and pixel data and any data fetched from the network may be accomplished using the semiconductor memory 706, possibly in concert with the hard disk drive 712.

In some instances, the program may be supplied to the user encoded on a CD-ROM or a floppy disk (both generally depicted by block 712), or alternatively could be read by the user from the network via a modem device connected to the computer, for example. Still further, the software can also be loaded into the computer system 700 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

Thus, a method, an apparatus, and a computer program product for remote authentication based on exchanging signals representing biometrics information and establishing a cryptographic key have been described. While only a small number of embodiments are described, it will be apparent to those skilled in the art, in view of this disclosure, that numerous changes and/or modifications can be made without departing from the scope and spirit of the invention.

What is claimed is:

1. A method of authenticating a remote party and establishing a cryptographic key for secure communications via an insecure communication channel, said method including the steps of:

generating a first challenge signal of minimum duration T, where T is a fixed time interval and is larger than the channel transmission and processing delay;

generating a random number x, computing $g^x$ modulo p, where g and p are numbers, deriving a key $k_A$ from $g^x$ modulo p, encrypting said first challenge signal with the key $k_A$ and a symmetric key cryptosystem to provide a first ciphertext, and sending the first ciphertext to said remote party;

receiving a second ciphertext from said remote party;

sending $g^x$ modulo p to said remote party and starting a clock;

receiving $g^y$ modulo p from paid remote party;

receiving a third ciphertext from said remote party, stopping the clock after receiving the third ciphertext and computing an elapsed time interval of said clock;

deriving a key $k_B$ from received $g^y$ modulo p, decrypting said second ciphertext with the key $k_B$ to recover a second challenge signal from said remote party;

computing $g^{xy}$ modulo p, deriving a key $k_{AB}$ from $g^{xy}$ modulo p;

decrypting said third ciphertext with the key $k_{AB}$ to recover a first response signal from said remote party;

verifying that said elapsed time of the clock is within a predetermined interval ($TL_A$, $TU_A$) where $TL_A$ and $TU_A$ are positive numbers;

verifying that said second challenge signal is produced by said remote party;

producing a second response signal of minimum duration T, encrypting said second response signal with the key $k_{AB}$ to provide a fourth ciphertext and sending the fourth ciphertext to said remote party;

verifying that said first response signal is a response produced by said remote party to said first challenge signal; and after verifying that said second challenge signal and that said first response signal are produced by said remote party and that said elapsed time is within the predetermined interval, using a key k from $g^{xy}$ modulo p for secure communications with said remote party.

2. The method according to claim 1, wherein said challenge signals and response signals represent biometrics characteristics of the authenticating and remote parties.

3. The method according to claim 1, wherein verification of said first response signal and said second challenge signal from said remote party are based on familiarity with the remote party's biometrics characteristics.

4. The method according to claim 1, where $TL_A$ is $t_1+t_2$ and $TU_A$ is $t_1+t_2+T$, with $t_1$ being the duration of said first challenge signal and $t_2$ being the duration of said first response signal.

5. The method according to claim 1, wherein the third ciphertext is received with $g^y$ modulo p from said remote party and before the fourth ciphertext is sent.

6. The method according to claim 1, wherein the fourth ciphertext is sent before the third ciphertext is received.

7. The method according to claim 1, wherein said challenge signals and response signals comprise voice signals of the authenticating and remote parties.

8. The method according to claim 1, wherein said challenge signals contain a freshness element, being an element indicative of when the challenge signal is generated.

9. The method according to claim 1, further comprising, at the remote party:

receiving the first ciphertext, containing the first challenge signal, generating a random number y, computing $g^y$ modulo p, where g and p are numbers;

producing the second challenge signal of minimum duration T, where T is a fixed time interval and is larger than the channel transmission and processing delay;

deriving a key $k_B$ from $g^y$ modulo p, encrypting said second challenge signal with the key $k_B$ and a symmetric key cryptosystem to provide the second ciphertext, and sending said second ciphertext;

receiving $g^x$ modulo p, deriving a key $k_A$ from $g^x$ modulo p, decrypting said first ciphertext with the key $k_A$ to recover the first challenge signal;

verifying that said first challenge signal is produced by the party which provided the first ciphertext, and producing the first response signal of minimum duration T;

computing $g^{xy}$ modulo p, deriving a key $k_{AB}$ from $g^{xy}$ modulo p, encrypting said first response signal with the key $k_{AB}$ to provide the third ciphertext and sending the third ciphertext;

sending $g^y$ modulo p and starting a second clock;

receiving the fourth ciphertext, stopping the second clock, and computing the elapsed time of the second clock, and decrypting the fourth ciphertext with the key $k_{AB}$ to recover the second response signal;

verifying that said elapsed time of said second clock is within a predetermined interval ($TL_B$, $TU_B$), where $TL_B$ and $TU_B$ are positive numbers;

verifying that said second response signal is a response produced by the party which provided the first ciphertext to said second challenge signal; and after verifying that said first challenge signal and that said second response signal are produced by the party which provided the first ciphertext and that said elapsed time is within the predetermined interval, using a key k from $g^{xy}$ modulo p for secure communications with the party which provided the first ciphertext.

10. An apparatus for authenticating a remote party and establishing a cryptographic key for secure communications via an insecure communication channel, said apparatus including:

means for generating a first challenge signal of minimum duration T, where T is a fixed time interval, and is larger than the channel transmission and processing delay;

means for generating a random number x, computing $g^x$ modulo p, where g and p are numbers, deriving a key $k_A$ from $g^x$ modulo p, encrypting said first challenge signal with the key $k_A$ and a symmetric key cryptosystem to provide a first ciphertext, and sending the first ciphertext to said remote party;

means for receiving a second ciphertext from said remote party;

means for sending $g^x$ modulo p to said remote party and starting a clock;

means for receiving $g^y$ modulo p from said remote party;

means for receiving a third ciphertext from said remote party, stopping the clock after receiving the third ciphertext and computing an elapsed time interval of said clock;

means for deriving a key $k_B$ from received $g^y$ modulo p, decrypting said second ciphertext with the key $k_B$ to recover a second challenge signal from said remote party;

means for computing $g^{xy}$ modulo p, deriving a key $k_{AB}$ from $g^{xy}$ modulo p;

means for decrypting said third ciphertext with the key $k_{AB}$ to recover a first response signal from said remote party;

means for verifying that said elapsed time of the clock is within a predetermined interval ($TL_A$, $TU_A$), where $TL_A$ and $TU_A$ are positive numbers;

means for verifying that said second challenge signal is produced by said remote party;

means for producing a second response signal of minimum duration T, encrypting said second response signal with the key $k_{AB}$ to provide a fourth ciphertext and sending the fourth ciphertext to said remote party;

means for verifying that said first response signal is a response produced by said remote party to said first challenge signal; and means for using a key k from $g^{xy}$ modulo p for secure communications with said remote party after verifying that said first response signal is a response produced by said remote party to said first challenge signal.

11. The apparatus according to claim 10, wherein said challenge signals and response signals represent biometrics characteristics of the authenticating and remote parties.

12. The apparatus according to claim 10, wherein verification of said first response signal and said second challenge signal from said remote party are based on familiarity with the remote party's biometrics characteristics.

13. The apparatus according to claim 10, where $TL_A$ is $t_1+t_2$ and $TU_A$ is $t_1+t_2+T$, with $t_1$ being the duration of said first challenge signal and $t_2$ being the duration of said first response signal.

14. The apparatus according to claim 10, wherein
the means for receiving the third ciphertext further comprises the means for receiving $g^y$ modulo p and is operable to receive the third ciphertext with $g^y$ modulo p from said remote party; and
the means for receiving the third ciphertext is operable to receive the third ciphertext before the fourth ciphertext is sent.

15. The apparatus according to claim 10, wherein the means for producing the second response signal is operable to send the fourth ciphertext before the third ciphertext is received.

16. The apparatus according to claim 10, wherein said challenge signals and response signals comprise voice signals of the authenticating and remote parties.

17. The apparatus according to claim 10, wherein said challenge signals contain a freshness element being an element indicative of when the challenge signal is generated.

18. A method of authenticating a remote party and establishing a cryptographic key for secure communications via an insecure communication channel, said method including the steps of:

receiving a first ciphertext, containing a first challenge signal, from said remote party, generating a random number y, computing $g^y$ modulo p, where g and p are numbers;

producing a second challenge signal of minimum duration T, where T is a fixed time interval and is larger than the channel transmission and processing delay;

deriving a key $k_B$ from $g^y$ modulo p, encrypting said second challenge signal with the key $k_B$ and a symmetric key cryptosystem to provide a second ciphertext, and sending said second ciphertext to said remote party;

receiving $g^x$ modulo p from said remote party, deriving a key $k_A$ from $g^x$ modulo p, decrypting said first ciphertext with the key $k_A$ to recover the first challenge signal from said remote party;

verifying that said first challenge signal is produced by said remote party, and producing a first response signal of minimum duration T;

computing $g^{xy}$ modulo p, deriving a key $k_{AB}$ from $g^{xy}$ modulo p, encrypting said first response signal with the key $k_{AB}$ to provide a third ciphertext and sending the third ciphertext to the remote party;

sending $g^y$ modulo p to said remote patty and staring a clock;

receiving a fourth ciphertext, stopping the clock, and computing the elapsed time of the clock, and decrypting the fourth ciphertext with the key $k_{AB}$ to recover a second response signal from said remote party;

verifying that said elapsed time of said clock is within a predetermined interval ($TL_B$, $TU_B$), where $TL_B$ and $TU_B$ are positive numbers;

verifying that said second response signal is a response produced by said remote party to said second challenge signal; and after verifying that said first challenge signal and that said second response signal are produced by said remote party and that said elapsed time is within the predetermined interval, using a key k from $g^{xy}$ modulo p for secure communications with the remote party.

19. The method according to claim 18, wherein said challenge signals and response signals represent biometrics characteristics of the authenticating and remote parties.

20. The method according to claim 18, wherein verification of said first challenge signal and said second response signal from said remote party are based on familiarity with the remote party's biometrics characteristics.

21. The method according to claim 18, where $TL_B$ is $t_3+t_4$ and $TU_B$ is $t_3+t_4+T$, with $t_3$ being the duration of the second challenge signal and $t_4$ being the duration of the second response signal.

22. The method according to claim 18, wherein $g^y$ modulo p is sent to said remote party with the third ciphertext and before the fourth ciphertext is received.

23. The method according to claim 18, wherein $g^y$ modulo p is sent to said remote party after receiving $g^x$ modulo p from said remote party and before the third ciphertext is sent.

24. The method according to claim 18, wherein said challenge signals and response signals comprise voice signals of the authenticating and remote parties.

25. The method according to claim 18, wherein said challenge signals contain a freshness element, being an element indicative of when the challenge signal is generated.

26. An apparatus for authenticating a remote party and establishing a cryptographic key for secure communications via an insecure communication channel, said apparatus including:

means for receiving a first ciphertext, containing a first challenge signal, from said remote party, generating a random number y, computing $g^y$ modulo p, where g and p are numbers;

means for producing a second challenge signal of minimum duration T, where T is a fixed time interval and is larger than the channel transmission and processing delay;

means for deriving a key $k_B$ from $g^y$ modulo p, encrypting said second challenge signal with the key $k_B$ and a symmetric key cryptosystem to provide a second ciphertext, and sending said second ciphertext to said remote party;

means for receiving $g^x$ modulo p from said remote party, deriving a key $k_A$ from $g^x$ modulo p, decrypting said first ciphertext with the key $k_A$ to recover the first challenge signal from said remote party;

means for verifying that said first challenge signal is produced by said remote party, and producing a first response signal of minimum duration T;

means for computing $g^{xy}$ modulo p, deriving a key $k_{AB}$ from $g^{xy}$ modulo p, encrypting said first response signal with the key $k_{AB}$ to provide a third ciphertext and sending the third ciphertext to the remote party;

means for sending $g^y$ modulo p to said remote party and starting a clock;

means for receiving a fourth ciphertext, stopping the clock, and computing the elapsed time of the clock, and decrypting the fourth ciphertext with the key $k_{AB}$ no recover a second response signal from said remote party;

means for verifying that said elapsed time of said clock is within a predetermined interval ($TL_B$, $TU_B$), where $TL_B$ and $TU_B$ are positive numbers;

means for verifying that said second response signal is a response produced by said remote party to said second challenge signal; and means for using key k from $g^{xy}$ modulo p for secure communications with the remote party, after verifying that said second response signal is a response produced by said remote party to said second challenge signal.

27. The apparatus according to claim 26, wherein said challenge signals and response signals are signals representing biometrics characteristics.

28. The apparatus according to claim 26, wherein verification of said first challenge signal and said second response signal from the remote party are based on familiarity with the remote party's biometrics characteristics.

29. The apparatus according to claim 26, where $TL_B$ is $t_3+t_4$ and $TU_B$ is $t_3+t_4+T$, with $t_3$ being the duration of the second challenge signal and $t_4$ being the duration of the second response signal.

30. The apparatus according to claim 26, wherein the means for computing $g^{xy}$ modulo p further comprises the means for sending $g^y$ modulo p and is operable to send $g^y$ modulo p to the remote party with the third ciphertext; and the means for sending $g^y$ modulo p is operable to send $g^y$ modulo p to said remote party before the fourth ciphertext is received.

31. The apparatus according to claim 26, wherein the means for sending $g^y$ modulo p is operable to send $g^y$ modulo p to said remote party after $g^x$ modulo p is received from said remote party and before the third ciphertext is sent.

32. The apparatus according to claim 26, wherein said challenge signals and response signals represent biometrics characteristics.

33. The apparatus according to claim 26, wherein said challenge signals and response signals comprise voice signals of the authenticating and remote parties.

34. The apparatus according to claim 26, wherein said challenge signals contain a freshness element being an element indicative of when the challenge signal is generated.

35. A method of authenticating a remote party and establishing a cryptographic key for secure communications via an insecure communication channel, said method including the steps of:

generating a first challenge signal of minimum duration T, where T is a fixed time interval and is larger than the channel transmission and processing delay;

generating a random number x, computing $g^x$ modulo p, where g, and p are numbers, deriving a key $k_A$ from $g^x$ modulo p, encrypting said first challenge signal with the key $k_A$ and a symmetric key cryptosystem to provide a first ciphertext, and sending the first ciphertext to said remote party;

receiving a second ciphertext, sending $g^x$ modulo p to said remote party, and starting a clock;

receiving $g^y$ modulo p, computing a key $k_B$ from $g^y$ modulo p, decrypting the second ciphertext with the key $k_B$ to recover a second challenge signal from said remote party;

verifying said second challenge signal to ensure that said second challenge signal is produced by said remote party, and producing a second response signal of minimum duration T;

computing $g^{xy}$ modulo p, deriving a key $k_{AB}$ from $g^{xy}$ modulo p, encrypting said second response signal with the key $k_{AB}$ to provide a fourth ciphertext and sending the fourth ciphertext to said remote party;

receiving a third ciphertext from said remote party, stopping said clock, decrypting the third ciphertext with the key $k_{AB}$ to recover a first response signal from said remote party;

verifying that said elapsed time of said clock is within a predetermined interval ($tl_A$, $tu_A$), where $tl_A$ and $tu_A$ are positive numbers;

verifying that said first response signal is a response produced by said remote party to said first challenge signal; and after verifying that said second challenge signal and that said first response signal are produced by said remote party and that said elapsed time is within the predetermined interval, using a key k from $g^{xy}$ modulo p for secure communications with said remote party.

36. The method according to claim 35, wherein said challenge signals and response signals are signals representing biometrics characteristics.

37. The method according to claim 35, wherein verification of said first response signal and said second challenge signal from the remote party are based on familiarity with the remote party's biometrics characteristics.

38. The method according to claim 35, where $tl_A$ is $T_1+T_2$ and $tu_A$ is $T_1+T_2+T$, with $T_1$ being the duration of said first challenge signal and $T_2$ being the duration of said first response signal.

39. An apparatus for authenticating a remote party and establishing a cryptographic key for secure communications via an insecure communication channel, said apparatus including:

means for generating a first challenge signal of minimum duration T, where T is a fixed time interval and is larger than the channel transmission and processing delay;

means for generating a random number x, computing $g^x$ modulo p, where g and p are numbers, deriving a key $k_A$ from $g^x$ modulo p, encrypting said first challenge signal with the $k_A$ and a symmetric key cryptosystem to provide a first ciphertext, and sending the first ciphertext to said remote party;

means for receiving a second ciphertext, sending $g^x$ modulo p to said remote party, and starting a clock;

means for receiving $g^y$ modulo p, computing a key $k_B$ from $g^y$ modulo p, decrypting the second ciphertext with the key $k_B$ to recover a second challenge signal from said remote party;

means for verifying said second challenge signal to ensure that said second challenge signal is produced by said remote party, and producing a second response signal of minimum duration T;

means for computing $g^{xy}$ modulo p, deriving a key $k_{AB}$ from $g^{xy}$ modulo p, encrypting said second response signal with the key $k_{AB}$ to provide a fourth ciphertext and sending the fourth ciphertext to said remote party;

means for receiving a third ciphertext from said remote party, stopping said clock, decrypting the third ciphertext with the key $k_{AB}$ to recover a first response signal from said remote party;

means for verifying that said elapsed time of said clock is within a predetermined interval ($tl_A$, $tu_A$), where $tl_A$ and $tu_A$ are positive numbers;

verifying that said first response signal is a response produced by said remote party to said first challenge signal; and means for generating a key k from $g^{xy}$ modulo p for secure communications with said remote party after verifying that said first response signal is a response produced by said remote party to said first challenge signal.

40. The apparatus according to claim 39, wherein said challenge signals and response signals are signals representing biometrics characteristics.

41. The apparatus according to claim 39, wherein verification of said first response signal and said second challenge signal from the remote party are based on familiarity with the remote party's biometrics characteristics.

42. The apparatus according to claim 39, where $tl_A$ is $T_1+T_2$ and $tu_A$ is $T_1+T_2+T$, with $T_1$ being the duration of said first challenge signal and $T_2$ being the duration of said first response signal.

43. A method of authenticating a remote party and establishing a cryptographic key for secure communications via an insecure communication channel, said method including the steps of:

receiving a first ciphertext, containing a first challenge signal, from the remote party, generating a random number y, computing $g^y$ modulo p, where g and p are numbers;

producing a second challenge signal of minimum duration T, where T is a fixed time interval and is larger than the channel transmission and processing delay;

deriving a key $k_B$ from $g^y$ modulo p, encrypting said second challenge signal with key $k_B$ and a symmetric key cryptosystem to provide a second ciphertext, and sending a second ciphertext to the remote party;

receiving $g^x$ modulo p, computing a key $k_A$ from $g^x$ modulo p, decrypting said first ciphertext with the key $k_A$ to recover the first challenge signal from remote party, sending $g^y$ modulo p to the remote party and starting a clock;

verifying said first challenge signal to make sure that said first challenge signal is produced by said remote party, and then producing a first response signal of minimum duration T;

computing $g^{xy}$ modulo p, deriving a key $k_{AB}$ from $g^{xy}$ modulo p, encrypting said first response signal with the key $k_{AB}$ to provide a third ciphertext and sending the third ciphertext to said remote party;

receiving a fourth ciphertext from said remote party, stopping the clock, decrypting said fourth ciphertext with the key $k_{AB}$ to recover a second response signal from said remote party;

verifying that said elapsed time of the clock is within a predetermined interval ($tl_B$, $tu_B$), where $tl_B$ and $tu_B$ are positive numbers;

verifying that said second response signal is a response produced by said remote party to said second challenge signal; and after verifying that said first challenge signal and that said second response signal are produced by said remote party and that said elapsed time is within the predetermined interval, using a key k from $g^{xy}$ modulo p for secure communications with the remote party.

44. The method according to claim 43, wherein said challenge signals and response signals are signals representing biometrics characteristics.

45. The method according to claim 43, wherein verification of said first challenge signal and said second response signal from said remote party are based on familiarity with the remote party's biometrics characteristics.

46. The method according to claim 43, where $tl_B$ is $T_3+T_4$ and $tu_B$ is $T_3+T_4+T$, with $T_3$ being the duration of said second challenge signal and $T_4$ being the duration of said second response signal.

47. An apparatus for authenticating a remote party and establishing a cryptographic key for secure communications via an insecure communication channel, said apparatus including:

means for receiving a first ciphertext, containing a first challenge signal, from the remote party, generating a random number y, computing $g^y$ modulo p, where g and p are numbers;

means for producing a second challenge signal of minimum duration T, where T is a fixed time interval and is larger than the channel transmission and processing delay;

means for deriving a key $k_B$ from $g^y$ modulo p, encrypting said second challenge signal with the key $k_B$ and a symmetric key cryptosystem to provide a second ciphertext, and sending the second ciphertext;

means for receiving $g^x$ modulo p, computing a key $k_A$ from $g^x$ modulo p, decrypting said first ciphertext with the key $k_A$ to recover the first challenge signal from the remote party, sending $g^y$ modulo p to the remote party and starting a clock;

means for verifying said first challenge signal to make sure that said first challenge signal is produced by said remote party, and then producing a first response signal of minimum duration T;

means for computing $g^{xy}$ modulo p, deriving a key $k_{AB}$ from $g^{xy}$ modulo p, encrypting said first response signal with the key $k_{AB}$ to provide a third ciphertext and sending the third ciphertext to said remote party;

means for receiving a fourth ciphertext from said remote party, stopping the clock, decrypting said fourth ciphertext with the key $k_{AB}$ to recover a second response signal from said remote party;

means for verifying that said elapsed time of the clock is within a predetermined interval ($tl_B$, $tu_B$), where $tl_B$ and $tu_B$ are positive numbers;

means for verifying that said second response signal is a response produced by said remote party to said second challenge signal; and means for using a key k from $g^{xy}$ modulo p for secure communications with the remote party, after verifying that said second response signal is a response produced by said remote party to said second challenge signal.

48. The apparatus according to claim 47, wherein said challenge signals and response signals are signals representing biometrics characteristics.

49. The apparatus according to claim 47, wherein verification of said first challenge signal and said second response signal from said remote party are based on familiarity with the remote party's biometrics characteristics.

50. The method according to claim 47, where $tl_B$ is $T_3+T_4$ and $tu_B$ is $T_3+T_4+T$, with $T_3$ being the duration of said second challenge signal and $T_4$ being the duration of said second response signal.

* * * * *